United States Patent
Conde et al.

[19]

[11] Patent Number: 6,012,772
[45] Date of Patent: Jan. 11, 2000

[54] INFLATABLE BICYCLE SEAT COVER

[75] Inventors: Manuel A Conde; Grant A. York, both of Helena, Ala.

[73] Assignee: Morcon Air, Inc., Helena, Ala.

[21] Appl. No.: 09/074,030

[22] Filed: May 6, 1998

[51] Int. Cl.⁷ ................................................. A47C 31/00
[52] U.S. Cl. ................................... 297/219.11; 297/195.1; 297/199; 297/215.1
[58] Field of Search ........................... 297/219.11, 195.1, 297/199

[56] References Cited

U.S. PATENT DOCUMENTS

| | | | |
|---|---|---|---|
| 562,919 | 6/1896 | Sager | 297/219.11 X |
| 1,991,751 | 2/1935 | Kennedy | 297/219.11 X |
| 4,451,083 | 5/1984 | Marchello | 297/219.11 X |
| 4,733,908 | 3/1988 | Dykstra et al. | 297/219.11 X |
| 4,786,104 | 11/1988 | Fellenbaum | 297/219.11 X |
| 4,957,286 | 9/1990 | Persons, II et al. | 297/199 X |
| 5,280,993 | 1/1994 | Hsh | 297/199 |
| 5,308,140 | 5/1994 | Yu | 297/195.1 |
| 5,318,344 | 6/1994 | Wang | 297/199 |
| 5,330,249 | 7/1994 | Weber | 297/199 X |
| 5,383,705 | 1/1995 | Voigt | 297/195.1 |
| 5,553,916 | 9/1996 | Yu | 297/197 X |
| 5,558,396 | 9/1996 | Yu | 297/195.1 |
| 5,634,685 | 6/1997 | Herring | 297/219.11 |
| 5,711,573 | 1/1998 | Daniels et al. | 297/199 |
| 5,769,488 | 6/1998 | Daniels et al. | 297/199 |
| 5,823,618 | 10/1998 | Fox et al. | 297/195.1 X |
| 5,890,760 | 4/1999 | Kirstein | 297/219.11 |

OTHER PUBLICATIONS

A Big Problem? Cycling and the Threat of Impotence, Mountain Biker Feb. 1998, Issue 36.
Bike Riding Can Cause Problems Leading to Impotence, Doctor Says Birmingham News, Monday, Oct. 27, 1997, Health & Fitness.

*Primary Examiner*—Peter M. Cuomo
*Assistant Examiner*—Rodney B. White
*Attorney, Agent, or Firm*—Sirote & Permutt; Russell Carter Gache

[57] ABSTRACT

A bicycle seat cover is provided which is adjustably inflatable by a bulb pump and two way pressure release valve. The bulb pump is positioned for easy access for inflation and deflation of a single chambered air bladder. The seat cover is removably attached to a bicycle saddle with hook and loop fasteners. The seat cover provides added comfort and cushion to the bicycle rider due to a quilted air bladder design and the increased surface area imparted to the bicycle's saddle. Materials contemplate use of a resilient anti-bacterial, water resistant. relatively thick polyurethane vinyl.

24 Claims, 10 Drawing Sheets

INFLATABLE BICYCLE SEAT COVER

FIELD OF THE INVENTION

This invention relates to bicycles and bicycle seat or saddle covers. Particularly, this invention relates to bicycle seat covers designed to provide adjustable degrees of cushion, added surface area, and comfort to a bicycle saddle.

BACKGROUND OF THE INVENTION

Numerous inventions have been created to act as a cover or to provide extra padding to bicycle saddles. Such inventions were primarily created for the purpose of overcoming the generally uncomfortable design of the typical bicycle seat. For example, U.S. Pat. No. 4,451,083 by J. Marchello provides a seat cover that is essentially a foam cushion having air spaces to allow deformation of the pad thereby providing a mechanism to reduce shock transmission from the seat to the rider. Likewise, another seat cover described in U.S. Pat. No. 4,733,908 is primarily a foam pad.

Other saddle cushions designed for damping vibrations and distributing pressure include U.S. Pat. No. 5,330,249 by F. Weber in which a bicycle seat is disclosed which incorporates a bladder of limited volume capacity. This design includes the bladder to help dampen initial shock forces and vibration over a viscoelastic gel support pad. Although this invention includes a valve for adjustable regulation of bladder pressure, the invention as a whole is designed not as a universal seat cover for any saddle, but as a stand alone saddle in and of itself. Moreover, the pressure within the bladder is not intended to provide cushion for the entire shock load and further cannot easily be inflated and deflated on demand without accessing a remote high pressure source to supply means of inflating the bladder.

Yet other mechanisms to absorb shock have been disclosed which comprise various arrangements of spring means. For instance U.S. Pat. No. 5,308,140 by S. Yu discloses a U shaped lever spring while U.S. Pat. Nos. 5,553,916 and 5,558,396 by T. Yu describe saddles having complex arrangements of coil springs.

Finally, other inventions such as that disclosed in U.S. Pat. No. 5,383,705 by B. Voigt provide shock absorbing means comprising piston/coil spring shock absorbers attached to the seat and seat post.

The inventions disclosed above are unlike the current invention in that they are susceptible to debilitating problems such as material fatigue or reduction of thickness of cushioning materials, with the result that there is either a decrease in body support area and/or a loss in shock absorption. Moreover, such designs often utilized attachment means susceptible to fatigue including string and elastic. Additionally, none of the above mentioned designs provides, effectively, an increase in surface area for distribution of weight.

Further, each of the above inventions lack all of the elements of the current invention and none of such disclosures suggest the simple combination provided herein. Generally, the prior inventions have been comprised of foams which have proven unsatisfactory due to their compressibility resulting in loss of shock absorbance to the rider. Moreover, such materials have been prone to breaking down over a period of use rendering the seats and seat covers useless. In contrast, the current invention comprises an adjustable air bladder within a thick polyurethane vinyl which is resistant to breakdown, is simple in construction, and is easy to inflate, deflate, attach and remove without fatigue to its component parts.

Additionally, it has been recognized by certain practitioners within the medical field that the typical current design of bicycle seats pose a detriment to nerves and arteries in the crotch area. Specifically, constant compression of nerves and arteries may give rise to impotence as well as numbing and painful conditions. Although cyclist stress that a rider should seek proper fitting of body to saddle, even such fitting may not solve the problems arising from a cyclist experiencing a constant hard compression on his or her perincum. The current invention provides a solution to such compression problems by furnishing an increased surface area to disperse pressure on such vital body parts and by providing a thick, low vibration compressible air cushion in that vital area.

SUMMARY OF THE INVENTION

It is a primary object of the invention to provide an air cushion cover for a bicycle seat having the capacity to adjust the degree of cushion by means of a hand operated air pump.

It is a preferred embodiment of the invention to provide a bicycle seat cover so as to suspend a rider from an existing bicycle saddle by an air cushion and to expand upon the surface area for the placement of the rider's mass so as to lessen pressures placed on any one surface area of a riders body. It is a further embodiment of the invention to provide an inflatable bicycle seat cover in which the air cushion provides the entire means of cushioning against shock and vibration.

It is another object of the invention to provide an inflatable bicycle seat cover that can be easily attached to and removed from a variety of bicycle saddles without the need for elastic bands or strings.

It is another embodiment of the invention to provide an inflatable bicycle seat cover made of a resilient polyurethane vinyl having a thickness of between 10 and 20 mils, and a single chambered bladder having the capacity to withstand pressures of between 0 and 5 pounds per square inch (psi).

It is still another object of the invention to provide an inflatable bicycle seat having a pressure valve assembly which is rated for pressures generally up to 5 psi, usually up to 3 psi, and preferably up to 2 psi. It is a further embodiment of the invention that the pressure valve assembly comprise a dual purpose pressure valve arrangement such that it may be used to regulate the flow of air being pumped into the bladder as well as air being expelled from the bladder.

It is still a further embodiment of the invention that the means by which air may be forced past one valve in the dual purpose valve assembly and into the bladder is a hand operated ball pump.

It is yet another object of the invention that the polyurethane vinyl material be sealed around the circumference of the bladder and further sealed to form quilted air pockets around and about the bladder using heat sealing methodologies including radio frequency (RF) heat sealing.

Yet another embodiment of the invention is the means for attaching the cover to a bicycle seat which means include hook and loop fasteners, or in the alternative, snaps, laces, or tape.

BRIEF DESCRIPTION OF THE DRAWINGS

The invention will be better understood by reference to the following detailed description of specific embodiments together with the figures that form part of this specification.

DETAILED DESCRIPTION OF THE INVENTION

Figure 1:
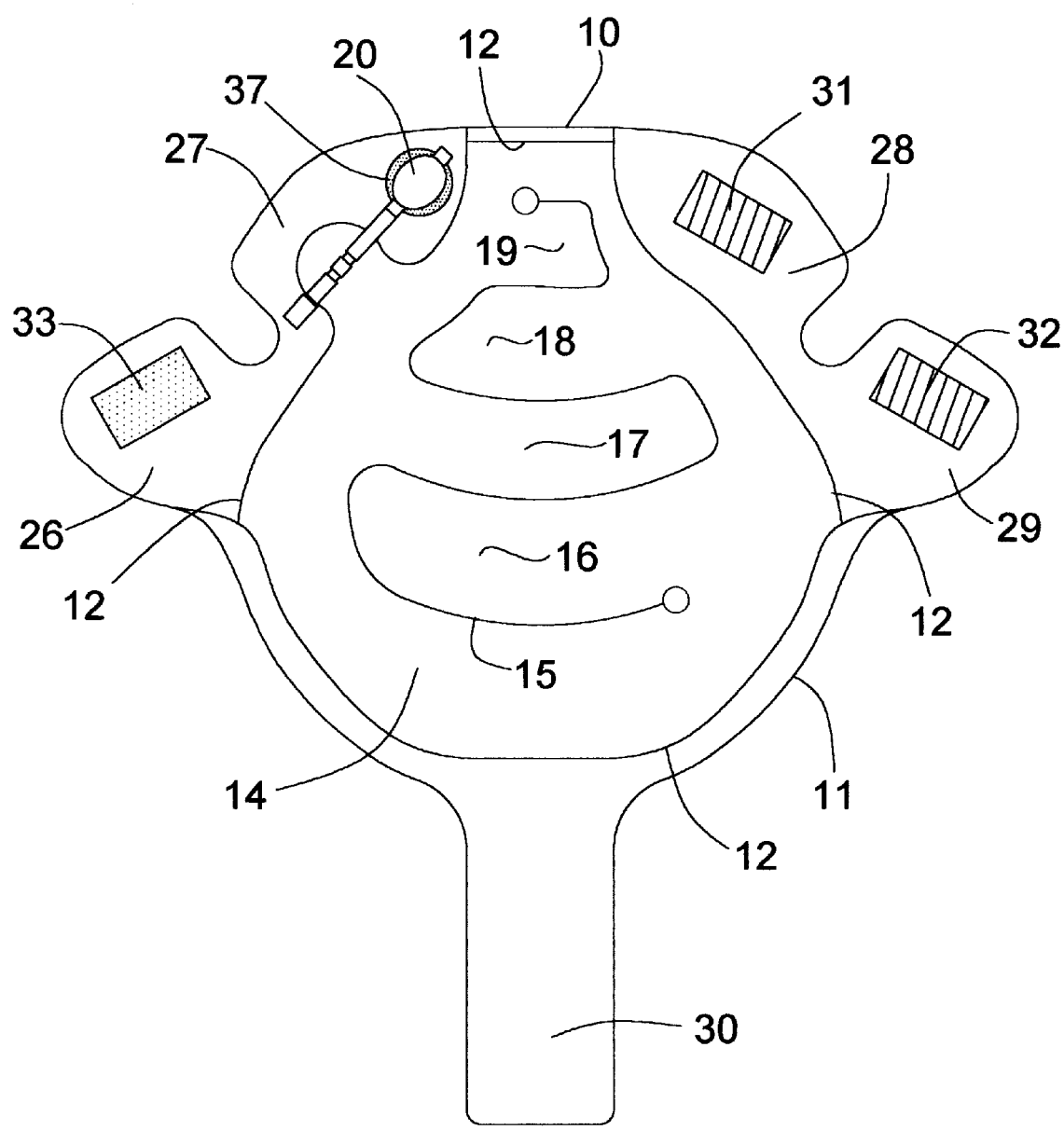
FIG. 1 is a top plan view of the invention showing its component elements.

Referring now to FIG. 1, a plan view of the saddle cover 10 is provided. The cover 10 is made of at least one sheet, and preferably two sheets, of a resilient polyurethane vinyl such as DUREFLEX™ polyurethane films manufactured by Deerfield Urethane, 8 Fairview Way, Whatley, Mass., 01093, having a thickness of between 10 and 20 mil. Where one sheet of the vinyl is used, it is contemplated that in order to create a bladder the sheet is to be folded back upon itself to create opposing outer layers of vinyl. The outer perimeter 11 of said opposing sheets are heat sealed along the outer perimeter 11 of the cushion material. Within the perimeter of the outer circumference heat seal is a second heat seal 12 which forms the outer boundary of air bladder 14. Within the area comprising the air bladder 14 a third seal between the opposing layers is provided in a sinusoidal curve 15 so as to provide air chambers or pockets 16, 17, 18, and 19 thereby creating quilting of the bladder when it is inflated. The polyurethane vinyl material is of a type having generally a Hardness of 90, specific gravity of 1.14, and tear strength of at least 425.

Figure 9:
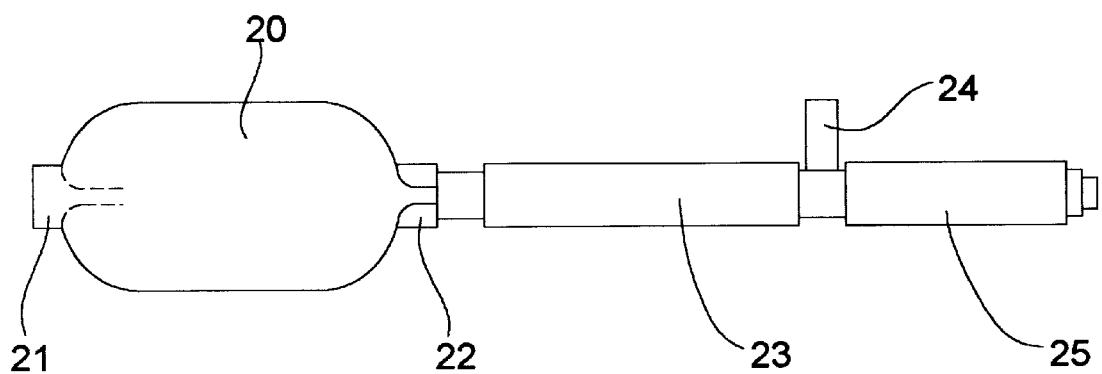
FIG. 9 is a detail diagram of the ball pump and dual valve assembly.
Figure 10:
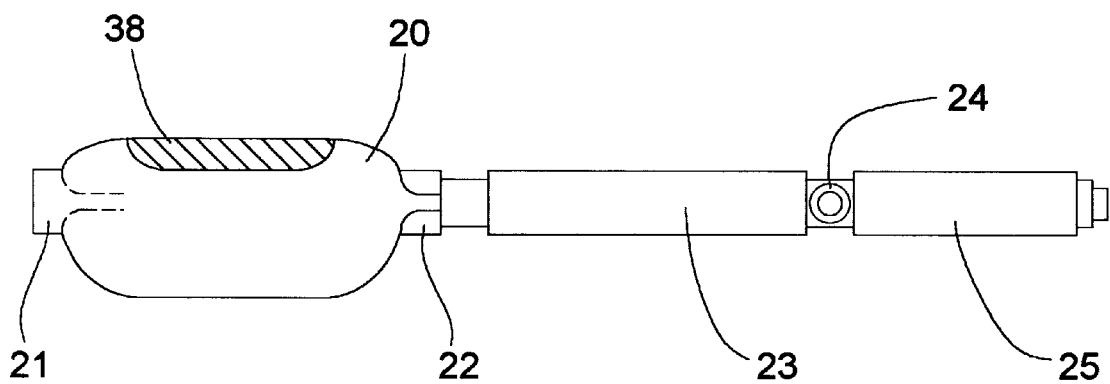
FIG. 10 is a side view of the ball pump and valve assembly.

Turning now to FIG. 9, detail of the bulb pump and dual valve arrangement is shown. Bulb 20 may be made so as to possess memory of resting state shape. In a preferred embodiment, the bulb is made of natural latex rubber having a wall thickness of about 0.07 inch and an overall diameter of generally 1.3 inches and a length from intake valve to exit valve of about 1.75 inches. The bulb may further be uniquely designed to provide a flattened surface on one side of the bulb sphere as depicted in FIG. 10. Such a feature will allow the bulb to posses a relatively low profile against the bicycle seat bottom when the apparatus is attached to the saddle.

Figure 3:
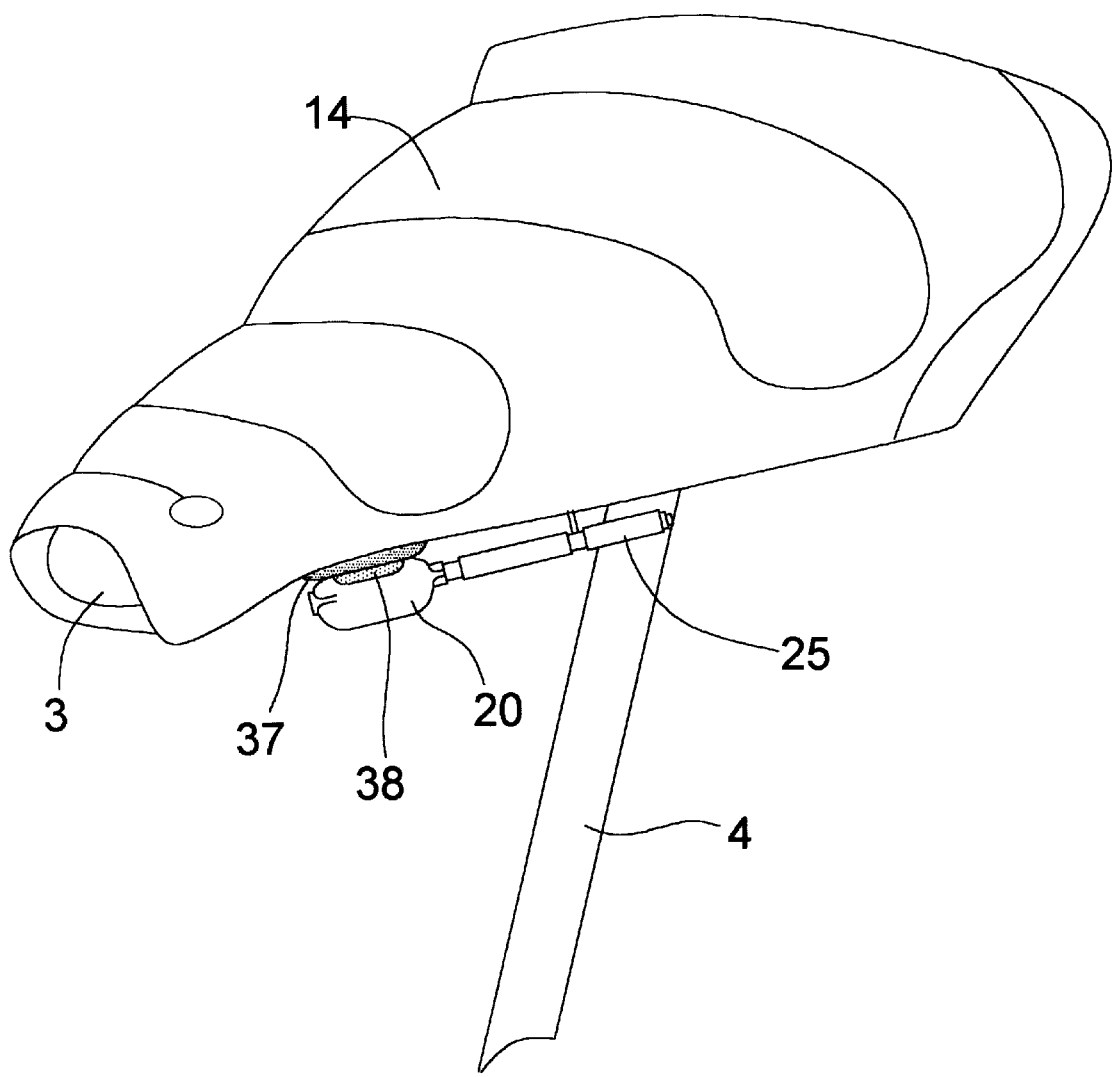
FIG. 3 is a frontal perspective view to the invention attached to a bicycle seat.
Figure 4:
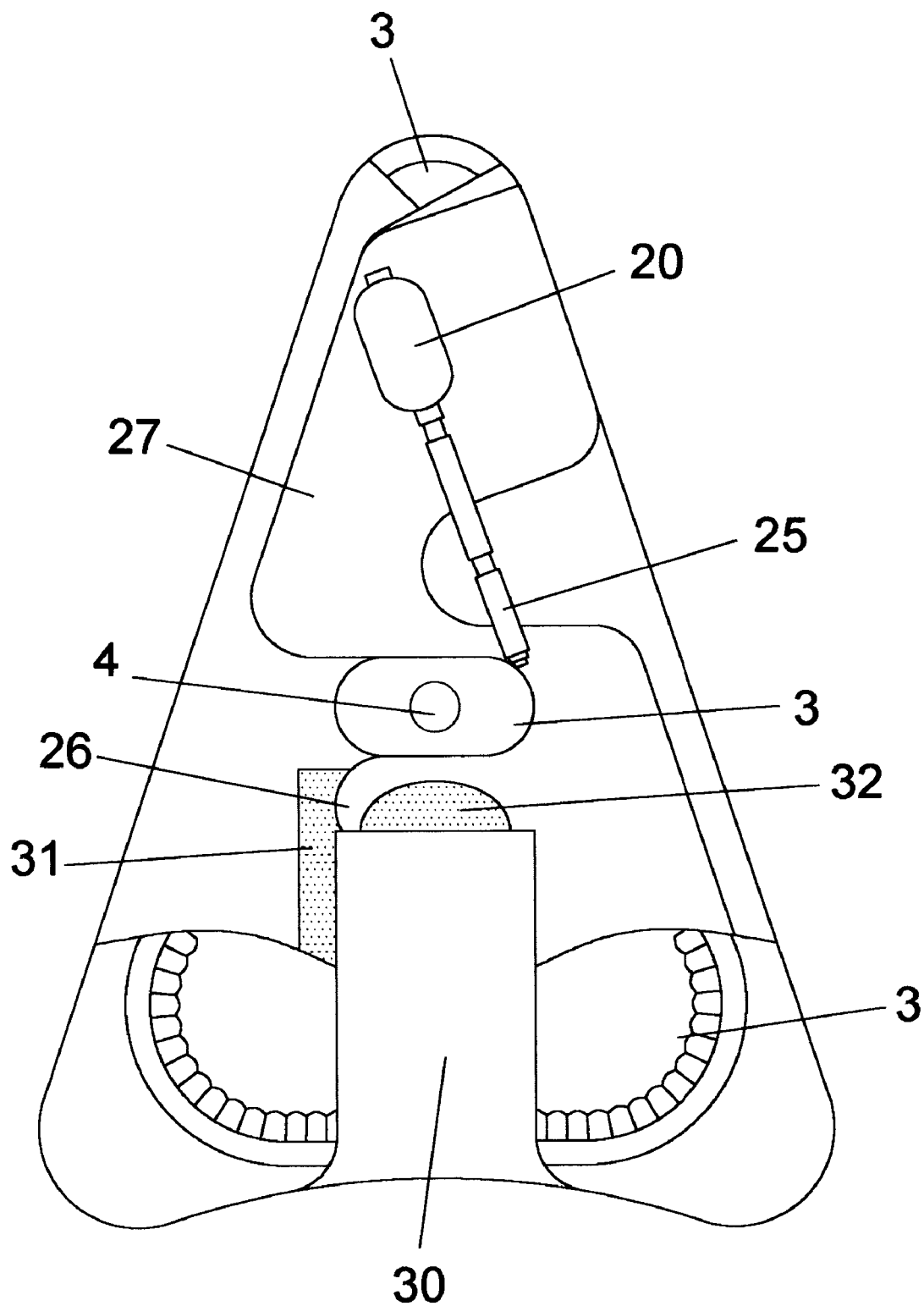
FIG. 4 is a bottom view of the invention showing hook and loop attachment strategy to a bicycle seat.
Figure 5:
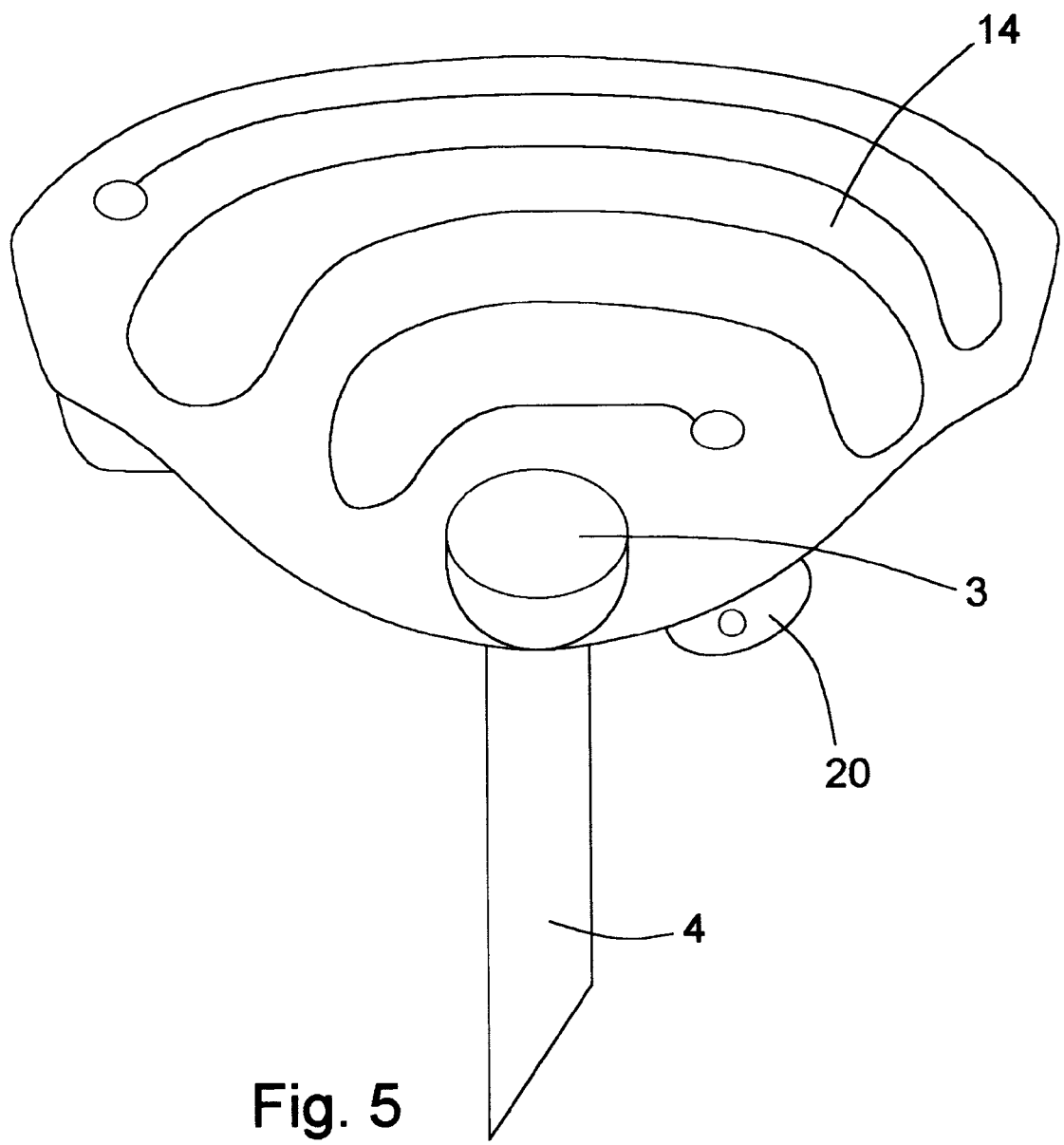
FIG. 5 is a front view of the invention attached to a bicycle seat.
Figure 6:
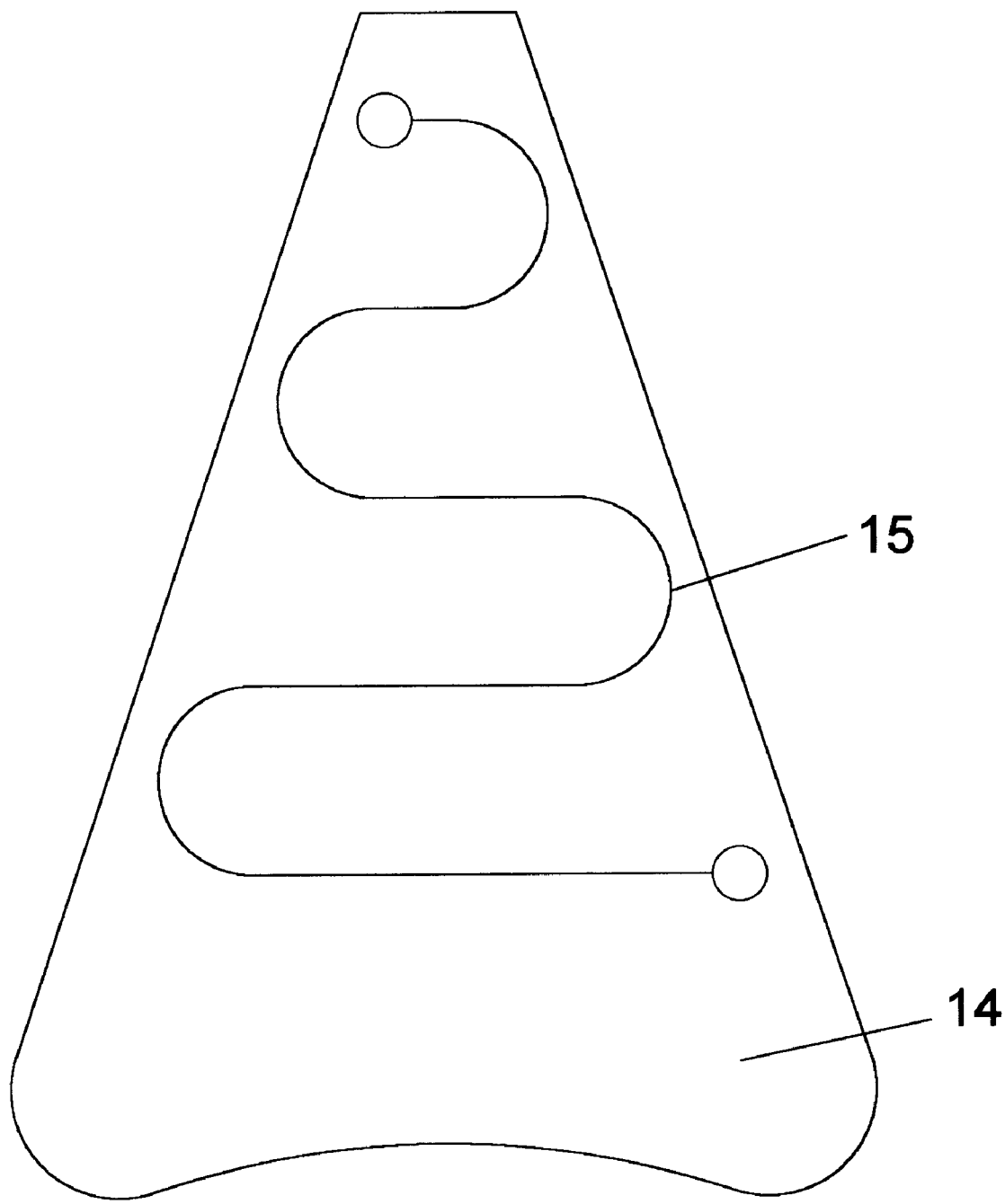
FIG. 6 is a top view of the invention attached to a bicycle seat.
Figure 7:
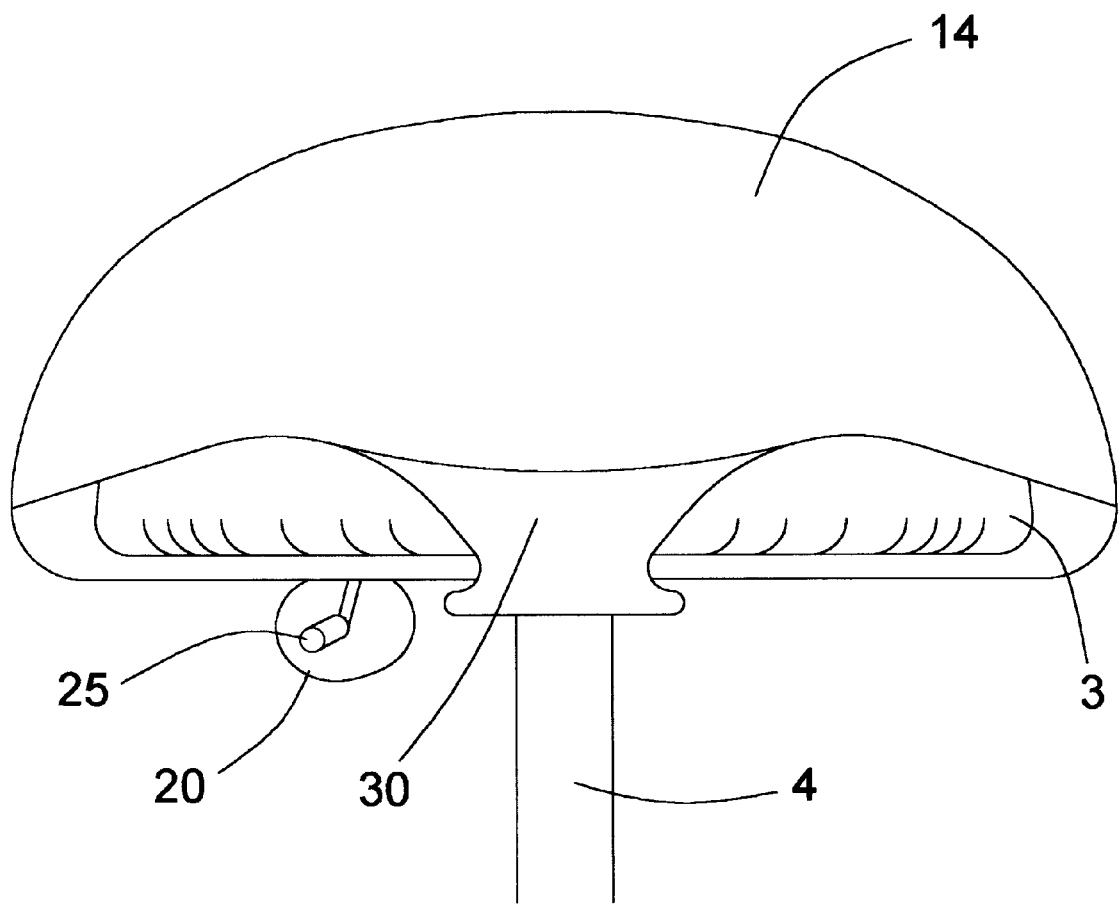
FIG. 7 is a rear view of the invention attached to a bicycle seat.
Figure 8:
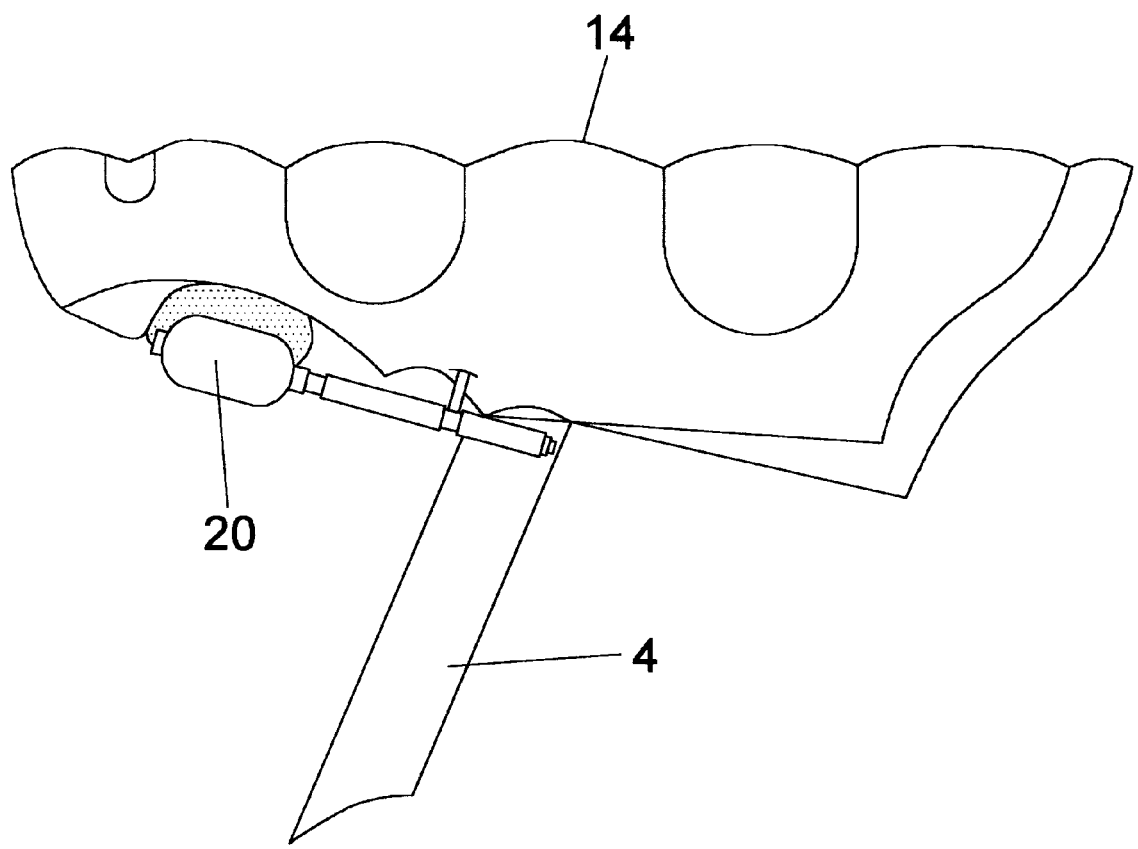
FIG. 8 is a side view of the invention attached to a bicycle seat.

The bulb has located on one end thereon a one-way plastic air intake check valve 21 and on the other end an air exit check valve 22 and air channel tube 23. When the bulb is squeezed, air is forced out the exit valve 22 and into air channel tube 23. When the bulb is released, air is sucked into the bulb through the check valve 21 from surrounding environmental air as the bulb returns to its resting state shape. Air that is forced into the air channel tube 23 passes directly into the bladder 14 via connection tube 24. The connection tube 24 is located along a lateral portion of the bladder 14 such that when the invention is strapped to a bicycle saddle the connection tube 24 lies directly beneath the saddle near the bicycle saddle post 4 (FIGS. 3 and 4). In such a position the bulb 14 and valve assembly are easily accessible to the cyclist's hand for either pumping air into or expelling air from the bladder 14. On the opposing side of the connection tube 24 opposite the bulb 20 is pressure release valve 25. The pressure release valve 25 is a push button operated valve well understood in the art such as a push button release valve manufactured by Martin -Weston Company, 10860, 76th Court, Unit B, Largo, Fla. 33777.

Figure 2:
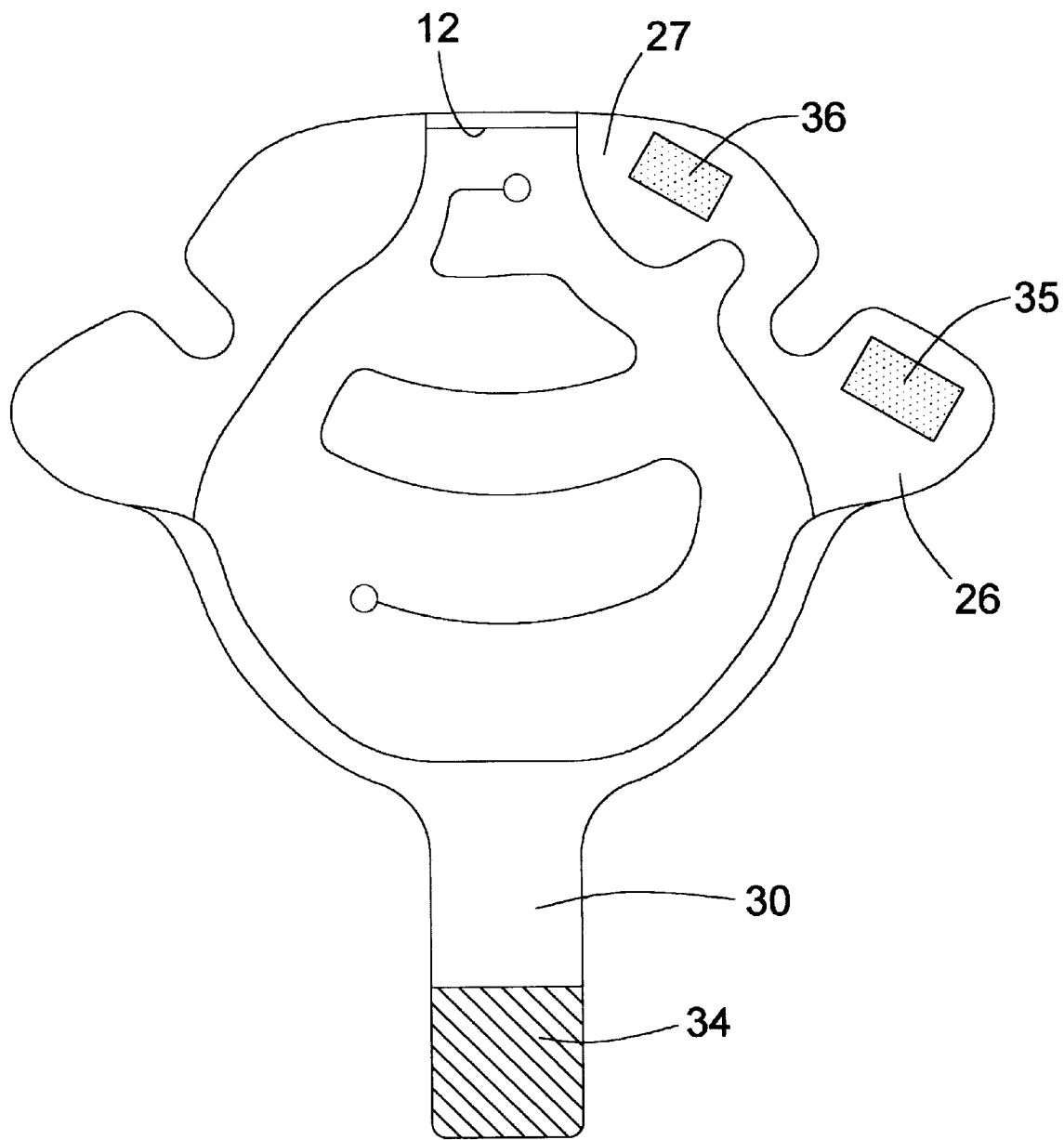
FIG. 2 is a bottom plan view of the invention showing one embodiment of attachment means, namely attachment of hook and loop fasteners.

The invention includes areas of polyurethane vinyl material external to the bladder 14 and internal to the outer seal 11 which are not inflatable and comprise tabs or wings 26, 27, 28, 29 and 30. These areas have means incorporated thereon, such as hook and loop fasteners, 31, 32, 33, 34, 35, 36 and 37 (FIGS. 1 and 2) for attaching the seat cover to the bicycle saddle. For example, in the example of FIG. 1, on the same surface of the bladder as the bulb and valve assembly, wings 28, and 29, may have attached thereto hook fasteners 31, and 32, and wings 26 and 27 may have attached thereto loop fasteners 33 and 37. On the reverse side of the bladder wings 26 and 27 may have attached thereto loop fasteners 35, and 36 while wing 30 may have attached thereto hook fastener 34.

Alternatively, the fasteners may be snaps such that component elements thereof may be located on the wings in a similar fashion as described for the hook and loop fasteners. Additionally, the bulb may have attached thereto a hook and loop fastener 38 positioned to mate with a like fastener 37 attached to wing 27 so that the bulb may be kept snugly against the bottom of the seat.

In the example of the drawings, the invention is first placed on the saddle 3 and the wings 28 and 29 opposite the bulb/valve assembly are wrapped under the saddle. Next the opposing wings 26 and 27 having the bulb/valve assembly are wrapped under the saddle and secured to the first wrapped wings via the fasteners. Finally, wing 30 is wrapped under the saddle 3 from the rear and attached to wing 26 via fasteners. The bladder can now be filled to the desired pressure using a pumping device, preferably a bulb pump 20 as shown in the accompanying drawings. Because of the secure fit originating from the fasteners and method of wrapping, as well as the pressure caused by the expansion of the bladder 14, the saddle cover is secured tightly to the saddle 3. If the cyclist desires to reduce the pressure in the bladder all that is required is momentary activation of the pressure release valve. To remove the cover from the saddle, the user need only to deflate the bladder and detach the fasteners.

The invention now being fully described, it will be apparent to one of ordinary skill in the art that many changes and modifications can be made thereto without departing from the spirit or scope of the appended claims.

What is claimed is:

1. In conjunction with a bicycle seat having a ventrally located support post, a saddle for supporting a rider, and a tapering front end, a bicycle seat cover comprising:

a bladder, a valve assembly, a channel, and fasteners, said bladder formed within a resilient material, said valve assembly attached to said resilient material and said bladder via said channel, said fasteners attached to a plurality of surface areas of said resilient material, and wherein said bladder includes a sinusoidally shaped heat seal forming a single sinusoidal gas chamber.

2. A bicycle seat cover according to claim 1 wherein said resilient material is polyurethane vinyl.

3. A bicycle seat cover as recited in claim 1, wherein said bladder includes a stepped series of graduated pockets increasing in size and volume in a direction away from said tapered end.

4. A bicycle seat cover as recited in claim 3, further including a rear wing for hugging a rear side of said saddle, said rear wing including means for clasping at least one of said fasteners.

5. A bicycle seat cover as recited in claim 4, wherein said resilient material includes a plurality of wings extending downward from said saddle, said wings transversely connected to each other under said saddle.

6. A bicycle seat cover as recited in claim 5, wherein some of said wings include shaped depressions for overlapping and surrounding said support post.

7. A bicycle seat cover as recited in claim 6, wherein said valve assembly is positioned on one of said wings proximal said tapered front end.

8. A bicycle seat cover as recited in claim 7, wherein said resilient material folds around said tapered front end to form a substantially cylindrical gap through which said front end is exposed.

9. A bicycle seat cover as recited in claim 8, wherein said bladder extends downward around both sides of said saddle for protecting said rider's upper thigh area.

10. In conjunction with a bicycle seat having a ventrally located support post, a saddle for supporting a rider, and a tapering front end, a bicycle seat cover comprising:

a bladder, a valve assembly, a channel, and fasteners, said bladder formed within a resilient material, said valve assembly attached to said resilient material and said bladder via said channel, said fasteners attached to a plurality of surface areas of said resilient material, and wherein said bladder includes a stepped series of graduated pockets increasing in size and volume in a direction away from said tapered end, and wherein said resilient material includes a plurality of wings extending downward from said saddle, said wings transversely connected to each other under said saddle, and wherein said valve assembly is positioned on one of said wings proximal said tapered front end.

11. In conjunction with a bicycle seat having a ventrally located support post, a saddle for supporting a rider, and a tapering front end, a bicycle seat cover comprising:

a bladder, a valve assembly, a channel, and fasteners, said bladder formed within a resilient material, said valve assembly attached to said resilient material and said bladder via said channel, said fasteners attached to a plurality of surface areas of said resilient material, and wherein said resilient material includes a plurality of wings extending downward from said saddle, said wings transversely connected to each other under said saddle and wherein said bladder extends downward around both sides of said saddle for protecting said rider's upper thigh area.

12. A bicycle seat cover as recited in claim 11, wherein said bladder includes a sinusoidally shaped heat seal forming a single sinusoidal gas chamber.

13. A bicycle seat cover as recited in claim 12, wherein some of said wings include shaped depressions for overlapping and surrounding said support post.

14. In conjunction with a bicycle seat having a ventrally located support post, a saddle for supporting a rider, and a tapering front end, a bicycle seat cover comprising:

bladder, a valve assembly a channel, and fasteners, said bladder formed within a resilient material, said valve assembly attached to said resilient material and said bladder via said channel, said fasteners attached to a plurality of surface areas of said resilient material, said resilient material including a plurality of wings extending downward from said saddle, said wings transversely connected to each other under said saddle, and wherein said valve assembly is positioned on one of said wings proximal said tapered front end.

15. A bicycle seat cover as recited in claim 14, wherein said bladder includes a sinusoidally shaped heat seal forming a single sinusoidal gas chamber.

16. In conjunction with a bicycle seat having a ventrally located support post, a saddle for supporting a rider, and a tapering front end, a bicycle seat cover comprising:

a bladder, a valve assembly, a channel, and fasteners, said bladder formed within a resilient material, said valve assembly attached to said resilient material and said bladder via said channel, said fasteners attached to a plurality of surface areas of said resilient material, and wherein said resilient material folds around said tapered front end to form a substantially cylindrical gap through which said front end is exposed.

17. A bicycle seat cover as recited in claim 16, wherein said bladder extends downward around both sides of said saddle for protecting said rider's upper thigh area.

18. A bicycle seat cover as recited in claim 17, wherein said bladder includes a sinusoidally shaped heat seal forming a single sinusoidal gas chamber.

19. In conjunction with a bicycle seat having a ventrally located support post, a saddle for supporting a rider, and a tapering front end, a bicycle seat cover comprising:

a bladder, a valve assembly, a channel, and fasteners, said bladder formed within a resilient material, said valve assembly attached to said resilient material and said bladder via said channel, said fasteners attached to a plurality of surface areas of said resilient material wherein said bladder extends downward around both sides of said saddle for protecting said rider's upper thigh area.

20. A bicycle seat cover as recited in claim 19, wherein said bladder includes a sinusoidally shaped heat seal forming a single sinusoidal gas chamber.

21. In conjunction with a bicycle seat having an upper saddle surface portion, a ventrally located support post, and a tapering front portion, an inflatable seat cover for reducing damage to nerves and arteries in a rider's crotch, comprising:

a. a resilient material extending over and down said saddle surface portion;

b. a bladder formed within said resilient material, said bladder having an outer boundary extending over and around said saddle surface portion, and wherein said bladder extends downward around both sides of said seat for protecting said rider's upper thigh area;

c. a valve assembly located proximal to said front portion, said valve assembly including a channel connected to said bladder; and, d. a plurality of wings extending underneath said bicycle seat for securing said cover to said seat, said wings each including fastening means for connecting one wing an opposing wing.

22. A seat cover as recited in claim 21, wherein said valve assembly is positioned on one of said wings proximal said tapered front portion.

23. In conjunction with a bicycle seat having an upper saddle surface portion, a ventrally located support post, and a tapering front portion, an inflatable seat cover for reducing damage to nerves and arteries in a rider's crotch, comprising:

a. a resilient material extending over said saddle surface portion, said material including opposing sets of wings depending downward from said saddle;

b. means for containing a gas within said resilient material, said gas containing means extending downward around both sides of said seat for protecting said rider's upper thigh area;

c. means for inflating and deflating said containing means positioned on one of said wings proximal said tapering front portion so that a rider may reach down and inflate or deflate said seat cover from between said rider's legs; and, d. means for detachably connecting said wings to one another under said bicycle seat.

24. A seat cover as recited in claim 23, wherein said resilient material folds around said tapered front end to form a substantially cylindrical gap through which said front portion is exposed.

* * * * *

UNITED STATES PATENT AND TRADEMARK OFFICE
CERTIFICATE OF CORRECTION

PATENT NO. : 6,012,772
DATED : January 11, 2000
INVENTOR(S) : Manuel A. Conde, et. al.

It is certified that error appears in the above-identified patent and that said Letters Patent is hereby corrected as shown below:

Title page, item [57], Abstract, line 10, after "resistant" change "." to --,--.

In Claim 11, line 49 after "saddle" insert --,--.

In Claim 14, line 61 before "bladder," insert --a--. In Claim 14, line 61 after "assembly" insert --,--.

Signed and Sealed this

Fourteenth Day of November, 2000

Q. TODD DICKINSON

Attest:

Attesting Officer

Director of Patents and Trademarks